Figure 1:
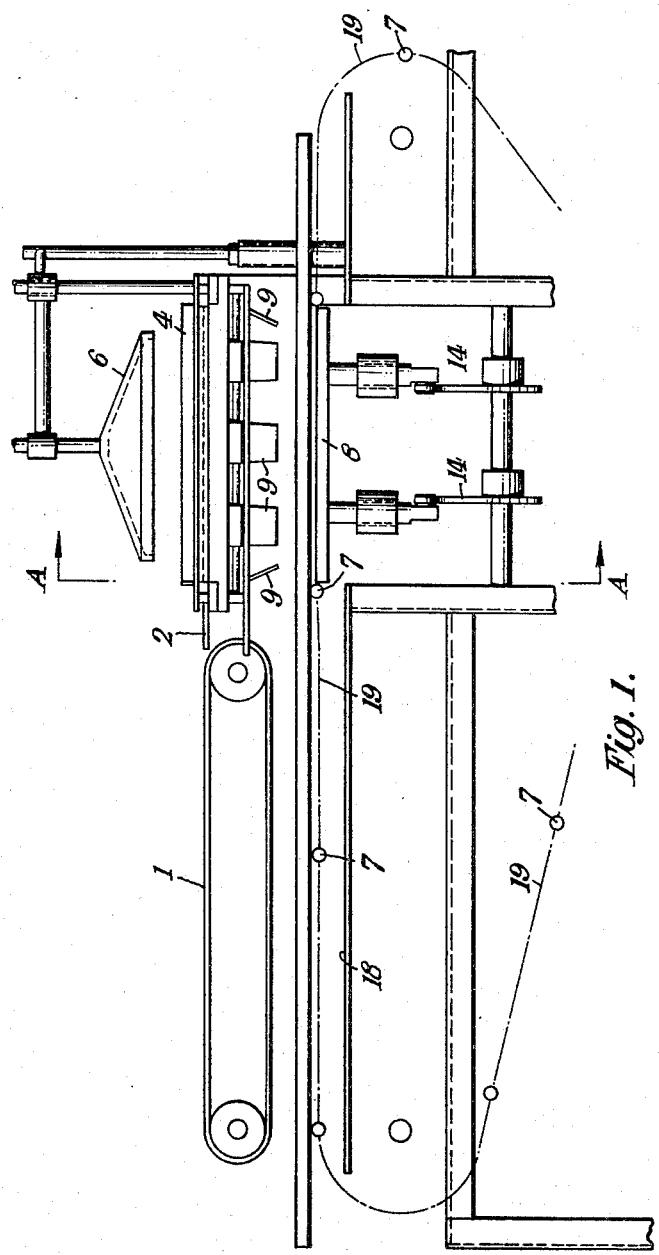

Sept. 26, 1961 H. J. HEBLIJ 3,001,350
PACKAGING MACHINES
Filed June 8, 1959 4 Sheets-Sheet 3

INVENTOR
Hendrik Johannes Heblij
BY
Watson, Cole, Grindle & Watson
ATTORNEYS

Sept. 26, 1961 H. J. HEBLIJ 3,001,350
PACKAGING MACHINES
Filed June 8, 1959 4 Sheets-Sheet 4

INVENTOR
Hendrik Johannes Heblij
By Watson, Cole, Grindle & Watson
ATTORNEYS

United States Patent Office 3,001,350
Patented Sept. 26, 1961

3,001,350
PACKAGING MACHINES
Hendrik Johannes Heblij, Rotterdam, Netherlands, assignor to The Forgrove Machinery Company Limited, Leeds, England, a company of Great Britain
Filed June 8, 1959, Ser. No. 818,586
Claims priority, application Great Britain June 10, 1958
5 Claims. (Cl. 53—245)

This invention has for its object to provide mechanism for loading articles individually or in layers into cartons or other box-like containers in such manner as to maintain control of the articles throughout the loading operation and ensure automatic positioning of the articles in the cartons. The loading operation is at present frequently performed by hand and the invention permits the cartons to be loaded automatically and at a speed suitable for modern packaging techniques.

The apparatus according to the invention comprises means for feeding individual articles or groups of articles in succession to a loading station, means for feeding cartons or like containers in succession to the loading station, a reciprocating loading member at the loading station which is adapted to engage each article or group of articles arriving at the loading station and to load it into the carton at said station, a plurality of resilient guide fingers at the loading station, and means for moving each carton arriving at the loading station towards the loading member to cause entry of said fingers into its open mouth, and retracting the carton after it has been loaded, the fingers being displaced outwardly by the article or group of articles as it enters the carton, thereby guiding it into the carton, and thereafter engaging behind the loaded article or group of articles to retain it in the carton.

Preferably the articles are loaded downwardly into the cartons and the loading member is constituted by a suction member for gripping the individual article or all the members of a group of articles which are to form a layer in a carton. In the latter case a plurality of suction members can be used, one for each article of the group.

In such case, on arrival of each carton at the loading station, movement is imparted to the suction member to move the group of articles carried thereby into position in the carton. Before entry of the articles into the carton, the latter is moved a short distance towards the articles, and in so doing freely engages the guide fingers which are positioned around the inner edge of the aperture in the carton. These fingers are lightly sprung towards the centre of the aperture, or may alternatively be actuated mechanically, e.g. by a cam, and as the articles are pushed through them by the suction member, they have the effect of accurately positioning the carton in relation to the articles and providing a lead-in for the articles. The length of these fingers is such that as the articles reach their final position in the carton, the fingers engage behind the articles and ensure that they will not return with the suction member. The suction is preferably broken by means of a suitable valve at the completion of the loading movement. Also, after the articles have safely entered the aperture in the carton, the carton is caused to withdraw from the fingers so as to be free to move from the loading position. The suction member then returns to its original position, a new supply of articles and a new carton are brought up to the loading station and the cycle restarts.

The above description relates to the case in which the cartons are to be loaded with only one layer of articles. If more than one layer of articles is to be loaded into each carton, the carton is caused to return progressively at each machine cycle through a distance equal to the depth of the layer. Alternatively, instead of moving the carton according to the layer being loaded, the stroke of the suction member could vary for each layer, appropriate vertical movement being applied to the fingers.

The guide fingers thus not only guide each layer of articles into the carton but make certain that the layer of articles is stripped off the suction pad. By lowering the carton in successive stages as layers of articles are inserted into it, it is possible to maintain this stripping and guiding action as successive layers of articles are placed in the carton.

Figure 2:
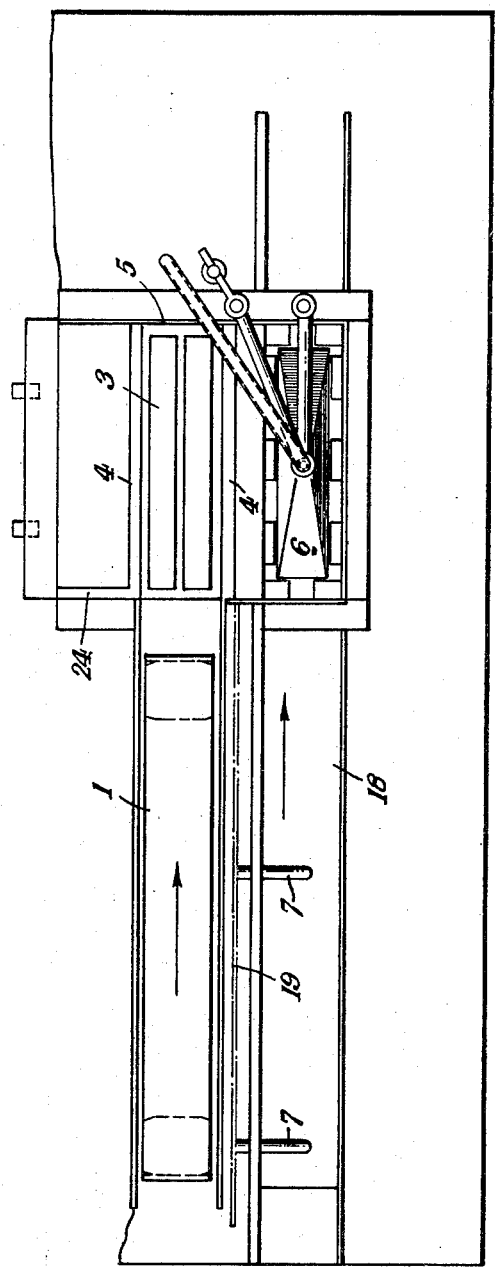
Figure 3:
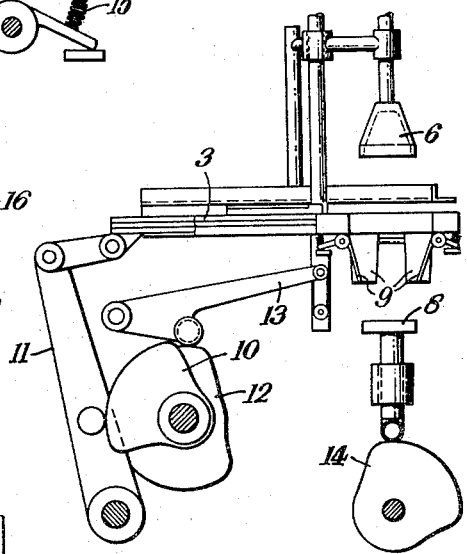

One specific embodiment of the invention, as applied to the loading of a carton with ten packets of cigarettes, placed therein in two layers each consisting of five packets, will now be described in more detail, by way of example, with reference to the accompanying diagrammatic drawings in which:

FIG. 1 is a side elevation of the apparatus,
FIG. 2 is a corresponding plan view,
FIG. 3 is a section on the line A—A in FIG. 1, and
FIGS. 4-7 are diagrammatic views on a larger scale showing successive stages in the loading of a carton.

Figure 4:
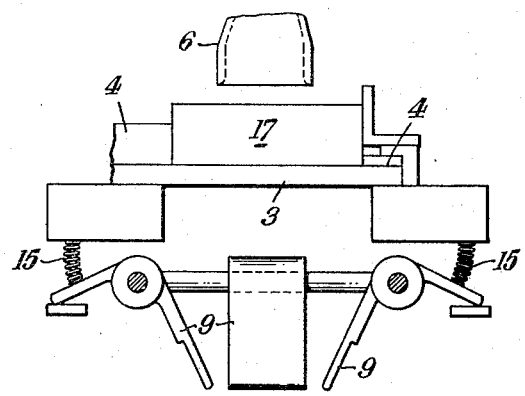
Figure 5:
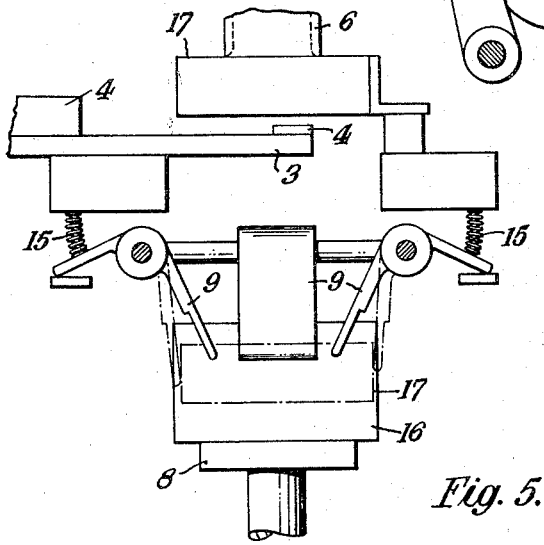

The cigarette packets are laid flat on a continuously moving belt 1, which feeds them over a dead plate 2 and on to a loading carrier 3. The carrier 3 is provided with shallow side guides 4 to control the packets sideways and is just long enough to take five packets. It also carries an end stop 5, against which the packets are pushed by the feed belt 1. This end stop may be associated with means for tripping the mechanism driving the machine in the event of there being an insufficient reservoir of packets on the feed belt 1. The carrier 3 now moves laterally and places the five packets immediately under a suction member 6 as indicated in FIG. 4. During this movement of the carrier 3 the following packets on the feed belt 1 are arrested by a flange 24 on one of the side guides. The suction member 6, which is initially at a level just high enough to safely clear the packets as they move into position below it, now moves down to contact the packets and suction is applied. It now lifts a short distance, as indicated in FIG. 5, carrying with it the five packets, which are held to it by suction, leaving the carrier 3 free to return to its original position ready to receive the next five packets. The carrier 3 receives reciprocating movement from a cam 10 (FIG. 3) through the agency of a cam lever 11, while the suction member 6 is reciprocated by a cam 12 through the agency of a cam lever 13.

The cartons to be loaded are carried along a platform 18 by lugs 7 on a chain 19 which moves intermittently in a direction parallel to the packet feed belt 1, and as they move along the lid of each carton is ploughed outwards by suitable rails (not shown) which guide it past the various mechanisms. The chain lugs 7 moves intermittently and the cartons are brought successively to rest in the loading position, immediately under the suction member 6 and above a lifting plunger 8. The lifting plunger 8, which receives reciprocating movement from a pair of cams 14, now rises to an extent such that a series of pivoted centralising fingers 9, which are urged inwardly by springs 15 and are mounted at a fixed level in the apparatus, enter the open mouth of the carton 16 as shown in FIG. 5. The suction member 6 then commences to move the packets 17 downwardly into the carton. When the packets have moved a short distance, they come into contact with the centralising fingers 9, causing these to be opened out and, in so doing, to open out the walls of the carton and to position the carton 16 very accurately under the descending packets 17. The fingers 9 also automatically provide a lead-in for the packets so that ease of entry into the carton is assured. The suction member 6 moves down to a position in which its face, and also the tops of the packets, are just below the tips of the centralising fingers 9, so that the centralising fingers are free to spring inwards a short distance above the packets, and ensure that the packets are not disturbed but strip cleanly from the suction member. The suction is broken as the loading movement is completed, and the suction member 6 returns upwards. During the loading of this first layer of packets, the carton has been raised by the lifting plunger 8 to the correct height to ensure that the packets are placed properly in the bottom of the carton.

Figure 6:
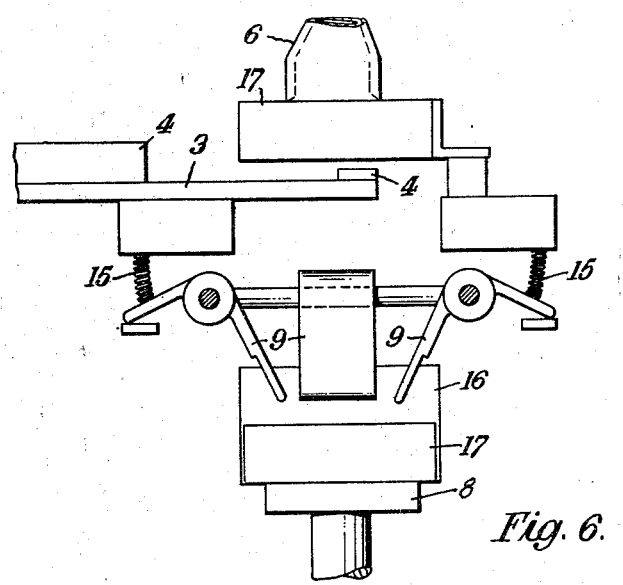
Figure 7:
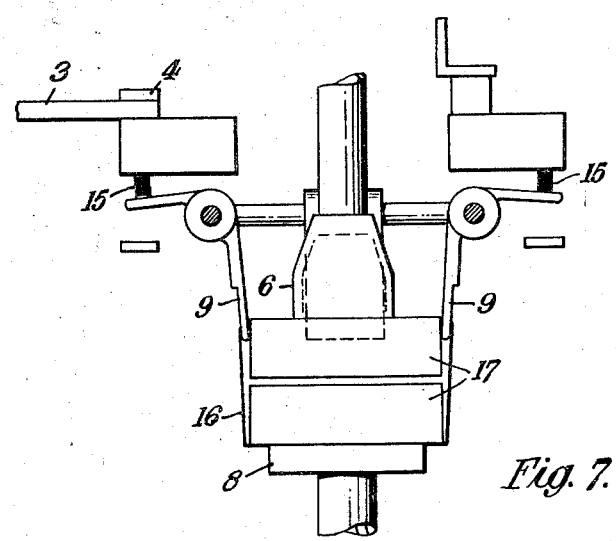

The operation is repeated in similar fashion as shown in FIGS. 6 and 7 for the second layer of five packets, except that in this case immediately after the packets have entered the mouth of the carton, the lifting plunger 8 lowers the carton away from the centralising fingers down to a suitable height to ensure correct positioning of the second layer. The lifting plunger 8 then makes a further slight downward movement to bring the loaded carton clear of the fingers 9, and the carton feed chain 19 starts to move, carrying the full carton away and bringing up the next empty carton ready for the cycle to recommence.

Any larger number of layers of articles could, of course, be loaded in this way, e.g. by adjustment or interchange of the cams 14, and the whole device is conveniently made adjustable to suit various sizes of cartons, or different types and sizes of loads.

Any known mechanisms, such for example as chutes or magazines, could be used instead of, or in addition to, the packet feed belt, for placing the packets into the loading carrier 3. Also known means can be associated with the carton conveyor chain for setting up the carton, or other type of container, and also for closing the lid of the carton after loading.

What I claim as my invention and desire to secure by Letters Patent is:

1. Apparatus for loading articles individually or in groups into cartons or like containers comprising a lifting platform, means for feeding open mouthed cartons in succession on to said lifting platform with their open mouths facing uppermost, a suction head aligned with the lifting platform, means for feeding a procession of articles to a position beneath said suction head, a plurality of resilient guide fingers positioned at a fixed level in the apparatus between the article feeding means and the lifting platform and extending in downwardly converging relationship, suction head actuating means for periodically moving the suction head downwards to engage articles beneath it and thereafter further downwards to load them into the open mouth of a carton on the lifting platform and thereafer returning said suction head to its initial position, and platform actuating means operating in timed relationship with said suction head actuating means for raising said platform and a carton thereon towards said suction head and thereafter again lowering said platform, said platform actuating means raising said cartons to a level at which said fingers enter the open mouth of the carton to facilitate entry of articles into said cartons and said suction head actuating means moving said suction head downwardly to an extent sufficient to move said articles past said fingers, said articles in passing said fingers displacing them into parallel relationship and said fingers returning resiliently after said articles have passed them into converging relation to strip said articles from said suction head on return movement thereof to its initial position.

2. Apparatus according to claim 1, wherein said fingers are pivotally mounted and which includes springs urging said fingers about their pivots into said converging relationship.

3. Apparatus for loading articles individually or in groups into cartons or like containers comprising a loading carrier, a lifting platform disposed beneath the loading carrier, means for feeding open mouthed cartons in succession on to the lifting platform with their open mouths facing upwards, a suction head aligned with the lifting platform, means for moving the loading carrier periodically from an article receiving position to a position beneath the suction head and back again, means for feeding articles on to the loading carrier when in its article receiving position, a plurality of resilient guide fingers positioned at a fixed level in the apparatus between the loading carrier and the lifting platform and extending in downwardly converging relationship, suction head actuating means for periodically moving the suction head downwards to engage articles on the loading carrier, then upwards to lift said articles from the loading carrier and then, after the loading carrier has returned to its article receiving position, further downwards to load said articles into the open mouth of a carton on the lifting platform and thereafter returning said suction head to its initial position, and platform actuating means operating in timed relationship with said suction head actuating means for raising said platform and a carton thereon towards said suction head and thereafter again lowering said platform, said platform actuating means raising said cartons to a level at which said fingers enter the open mouth of the carton to facilitate entry of articles into said cartons and said suction head actuating means moving said suction head downwardly to an extent sufficient to move said articles past said fingers, said articles in passing said fingers displacing them into parallel relationship and said fingers returning resiliently after said articles have passed them into converging relation to strip said articles from said suction head on return movement thereof to its initial position.

4. Apparatus according to claim 3, which includes a continuously moving conveyor for feeding articles on to the loading carrier and wherein said carrier is provided with a first stop for arresting articles fed on to the carrier from said conveyor and a second stop for arresting the articles on said conveor while said carrier is moving to position beneath the suction head and back to its article receiving position.

5. Apparatus for loading groups of articles into cartons in successive layers, comprising a lifting platform, a conveyor for feeding open mouthed cartons in succession on to said lifting platform with their open mouths upwards, a suction head aligned with the lifting platform, means for feeding a procession of articles to a position beneath said suction head, a plurality of resilient guide fingers positioned at a fixed level in the apparatus between the article feeding means and the lifting platform and extending in downwardly converging relationship, suction head actuating means for periodically moving the suction head to engage a group of articles beneath it and thereafter downwards to load said group of articles into the open mouth of the carton on the lifting platform and thereafter returning said suction head to its initial position, and platform actuating means operating in timed relationship with said suction head actuating means for raising said platform and a carton thereon towards said suction head and thereafter lowering said platform in stages to permit of successive introduction of layers of articles into said carton and finally to return the loaded carton to the conveyor, said platform actuating means raising said cartons to a level at which said fingers enter the open mouth of the carton to facilitate entry of articles into said cartons and said suction head actuating means moving said suction head downwardly to an extent sufficient to move said articles past said fingers, said articles in passing said fingers displacing them into parallel relationship and said fingers returning resiliently after said articles have passed them into converging relation to strip said articles from said suction head on return movement thereof to its initial position.

References Cited in the file of this patent

UNITED STATES PATENTS

| | | |
|---|---|---|
| 1,045,391 | Graf | Nov. 26, 1912 |
| 1,247,722 | Rogers et al. | Nov. 27, 1917 |
| 1,518,556 | Boettcher | Dec. 9, 1924 |
| 1,984,926 | Heilbrunn | Dec. 18, 1934 |
| 2,179,648 | Thayer | Nov. 14, 1939 |
| 2,524,846 | Socke et al. | Oct. 10, 1950 |
| 2,647,671 | McInery | Aug. 4, 1953 |
| 2,691,472 | Weimer | Oct. 12, 1954 |
| 2,819,576 | Hendricks et al. | Jan. 14, 1958 |
| 2,825,193 | Loveridge | Mar. 4, 1958 |
| 2,834,167 | Loveridge | May 13, 1958 |

FOREIGN PATENTS

| | | |
|---|---|---|
| 707,068 | Great Britain | Apr. 14, 1954 |